United States Patent
Little et al.

(10) Patent No.: US 9,003,181 B2
(45) Date of Patent: Apr. 7, 2015

(54) INCORPORATING DATA INTO CRYPTOGRAPHIC COMPONENTS OF AN ECQV CERTIFICATE

(75) Inventors: Herbert Anthony Little, Waterloo (CA); Matthew John Campagna, Ridgefield, CT (US); Scott Alexander Vanstone, Campbellville (CA); Daniel Richard L. Brown, Mississauga (CA)

(73) Assignees: Certicom Corp., Mississauga, Ontario (CA); BlackBerry Limited, Waterloo, Ontario (CA)

( * ) Notice: Subject to any disclaimer, the term of this patent is extended or adjusted under 35 U.S.C. 154(b) by 867 days.

(21) Appl. No.: 13/070,178

(22) Filed: Mar. 23, 2011

(65) Prior Publication Data

US 2012/0246465 A1 Sep. 27, 2012
US 2013/0067218 A2 Mar. 14, 2013

(51) Int. Cl.
| | | |
|---|---|---|
| H04L 29/00 | (2006.01) | |
| H04L 9/08 | (2006.01) | |
| H04L 9/30 | (2006.01) | |
| H04L 9/32 | (2006.01) | |

(52) U.S. Cl.
CPC ............ H04L 9/0844 (2013.01); H04L 9/3066 (2013.01); H04L 9/3263 (2013.01)

(58) Field of Classification Search
CPC .............................. H04L 9/3066; H04L 9/083
See application file for complete search history.

(56) References Cited

U.S. PATENT DOCUMENTS

| | | | |
|---|---|---|---|
| 6,163,841 A | 12/2000 | Venkatesan et al. | |
| 6,209,093 B1 | 3/2001 | Venkatesan et al. | |
| 6,389,537 B1 | 5/2002 | Davis et al. | |
| 7,093,130 B1 | 8/2006 | Kobayashi et al. | |
| 7,941,667 B2 | 5/2011 | Miyazaki et al. | |
| 7,971,063 B2 | 6/2011 | Guenther | |
| 8,009,829 B2 | 8/2011 | Jueneman et al. | |
| 8,386,790 B2 | 2/2013 | Bhattacharya et al. | |
| 8,675,869 B2 | 3/2014 | Little et al. | |

(Continued)

FOREIGN PATENT DOCUMENTS

| | | |
|---|---|---|
| EP | 1083700 A2 | 3/2001 |
| EP | 2302834 A2 | 3/2011 |

(Continued)

OTHER PUBLICATIONS

Struik et al. SEC 4 Elliptic Curve Qu-Vanstone Implicit Certificate version 0.91 Oct. 17, 2008.*

(Continued)

*Primary Examiner* — Brandon Hoffman
*Assistant Examiner* — Helai Salehi
(74) *Attorney, Agent, or Firm* — Fish & Richardson P.C.

(57) ABSTRACT

During generation of an implicit certificate for a requestor, a certificate authority incorporates information in the public-key reconstruction data, where the public-key reconstruction data is to be used to compute the public key of the requestor. The information may be related to one or more of the requestor, the certificate authority, and the implicit certificate. The certificate authority reversibly encodes the public-key reconstruction data in the implicit certificate and sends it to the requestor. After receiving the implicit certificate from the certificate authority, the requestor can extract the incorporated information from the public-key reconstruction data. The implicit certificate can be made available to a recipient, and the recipient can also extract the incorporated information.

32 Claims, 6 Drawing Sheets

(56) References Cited

U.S. PATENT DOCUMENTS

| | | | |
|---|---|---|---|
| 2005/0195975 | A1 | 9/2005 | Kawakita |
| 2007/0064932 | A1* | 3/2007 | Struik et al. .............. 380/30 |
| 2008/0301459 | A1 | 12/2008 | Ebeid |
| 2009/0022311 | A1 | 1/2009 | Vanstone et al. |
| 2010/0023771 | A1 | 1/2010 | Struik |
| 2010/0106973 | A1 | 4/2010 | Guenther |
| 2010/0166188 | A1 | 7/2010 | Qu et al. |
| 2010/0308978 | A1 | 12/2010 | Brown |
| 2011/0055585 | A1 | 3/2011 | Lee |
| 2012/0243680 | A1 | 9/2012 | Little et al. |
| 2012/0246465 | A1 | 9/2012 | Little et al. |

FOREIGN PATENT DOCUMENTS

| | | | |
|---|---|---|---|
| WO | 2009009868 | A1 | 1/2009 |
| WO | 2009030021 | A1 | 3/2009 |
| WO | 2009090519 | A1 | 7/2009 |
| WO | 2010/129694 | A1 | 11/2010 |
| WO | 2010124390 | A1 | 11/2010 |

OTHER PUBLICATIONS

Vanstone et al. (WO 2009/009868 A1, Jan. 22, 2009).*
SEC1: Elliptic Curve Cryptography, Standards for Efficient Cryptography Group, 2000.
SEC4: Elliptic Curve Cryptography, Standards for Efficient Cryptography Group, Working Draft, 2006.
PKCS #1 v2.1: RSA Cryptography Standard, RSA Laboratories, Jun. 14, 2002.
PKCS #10 v1.7: Certification Request Syntax Standard, RSA Laboratories, May 26, 2000.
ANSI X9.62:2005: Public Key Cryptography for the Financial Services Industry, The Elliptic Curve Digital Signature Algorithm (ECDSA); Nov. 16, 2005.
Notice of Allowance and Fee(s) Due mailed Oct. 23, 2013, in corresponding U.S. Appl. No. 13/070,226.
Examination Report mailed Oct. 18, 2013, in corresponding European patent application No. 11162139.7.
Final Office Action mailed Aug. 1, 2013, in corresponding U.S. Appl. No. 13/070,226.
Non-Final Office Action mailed Jan. 7, 2013, in corresponding U.S. Appl. No. 13/070,226.
The International Search report and Written Opinion mailed Nov. 28, 2012, in corresponding PCT patent application No. PCT/IB2012/051259.
Extended European Search Report mailed Dec. 5, 2011; in corresponding application No. 11162139.7.
Struik et al. SEC 4: Elliptic Curve Qu-Vanstone Implicit Certificate Scheme (ECQV), vol. 91. Internet Citation, Nov. 18, 2008, p. 22PP, XP007914511, Retrieved from Internet URL:http://www.secg.org/download/aid-775/sec4-ECQV-v091.pdf. retrieved on Aug. 18, 2010.
Extended European Search Report mailed Dec. 5, 2011; in corresponding application No. 11162141.3.
Examination Report mailed Jan. 29, 2014; in corresponding European patent application No. 11162141.3.
Office Action mailed Dec. 9, 2013; in corresponding Canadian patent application No. 2,768,861.
Notice of Allowance and Fee(s) Due mailed Oct. 17, 2014; in U.S. Appl. No. 14/218,513.
Examination Report mailed Jul. 16, 2014; in corresponding European patent application No. 11162141.3.
Johnson, Don; "The elliptic Curve Digital Signature Algorithm (ECDSA)", published Jul. 27, 2001.
Menezes, P.; Handbook of Applied Cryptography, Chapter 11 Digital Signatures; 1996.
Young, A.; "Chapter 10: Subliminal Channels," In: "Malicious Cryptography," 2014, Wiley, pp. 211-228. ISBN: 978-1-28-391692-9.

* cited by examiner

INCORPORATING DATA INTO CRYPTOGRAPHIC COMPONENTS OF AN ECQV CERTIFICATE

TECHNICAL FIELD

The technology described herein relates generally to elliptic curve cryptography, and particularly to the generation of cryptographic keys, implicit certificates and digital signatures.

BACKGROUND

Elliptic curve cryptography (ECC) is based on the intractability of the discrete logarithm problem within a group over a finite field where the elements of the group are points on an elliptic curve. Cryptographic values generated using ECC schemes, such as the Elliptic Curve Digital Signature Algorithm (ECDSA), may be smaller than those generated using finite-field cryptography schemes, such as the Digital Signature Algorithm (DSA) and integer factorization cryptography schemes, such as the Rivest Shamir Adleman (RSA) algorithm, while still offering the same level of security. Smaller-sized cryptographic values are desirable because they may reduce storage and transmission requirements. ECDSA is described, for example, in "American National Standard for Financial Services ANS X9.62-2005: Public Key Cryptography for the Financial Services Industry—The Elliptic Curve Digital Signature Algorithm (ECDSA)", Accredited Standards Committee X9, Inc., 2005. DSA and RSA are described, for example, in "Federal Information Processing Standards Publication 186-3 Digital Signature Standard (DSS)", National Institute of Standards and Technology, June 2009.

A digital certificate may be used to bind a public key to its legitimate owner so that a recipient of the certificate can be confident as to the authenticity of the public key. Upon receiving a request from a requestor, a trusted third party, such as a certificate authority (CA), may provide a signed certificate to the requestor who may then send the certificate to a recipient. Alternatively, the recipient may be able to obtain the signed certificate directly from the CA. In a conventional or 'explicit' certificate scheme, the signature portion of the certificate is explicitly verified by the recipient in order to confirm that the public key contained in the certificate belongs to the purported owner (i.e., the requestor of the certificate). Subsequent communication between the requestor and the recipient is authenticated separately using, for example, a key agreement scheme or a digital signature scheme.

In an implicit certificate scheme, such as the Elliptic Curve Qu-Vanstone (ECQV) scheme, the implicit certificate does not explicitly contain the public key of the requestor, but instead contains data that may be used to reconstruct the public key, also known as public-key reconstruction data. Because the public key is not explicitly contained in the implicit certificate, the authenticity of the reconstructed public key can only be established after it is subsequently used in a successful run of some protocol, such as a key agreement scheme or a digital signature scheme.

Implicit certificates are generally smaller than explicit certificates and have fewer operational costs because some calculations that are typically performed independently in an explicit certificate scheme can be combined in an implicit certificate scheme. In addition to containing public-key reconstruction data, an implicit certificate also contains separate additional information. This additional information contributes to the size of the implicit certificate.

BRIEF DESCRIPTION OF THE DRAWINGS

The figures of the accompanying drawings are intended to illustrate by way of example and not limitation. Like reference numbers in the figures indicate corresponding, analogous or similar elements.

DETAILED DESCRIPTION

Figure 1:
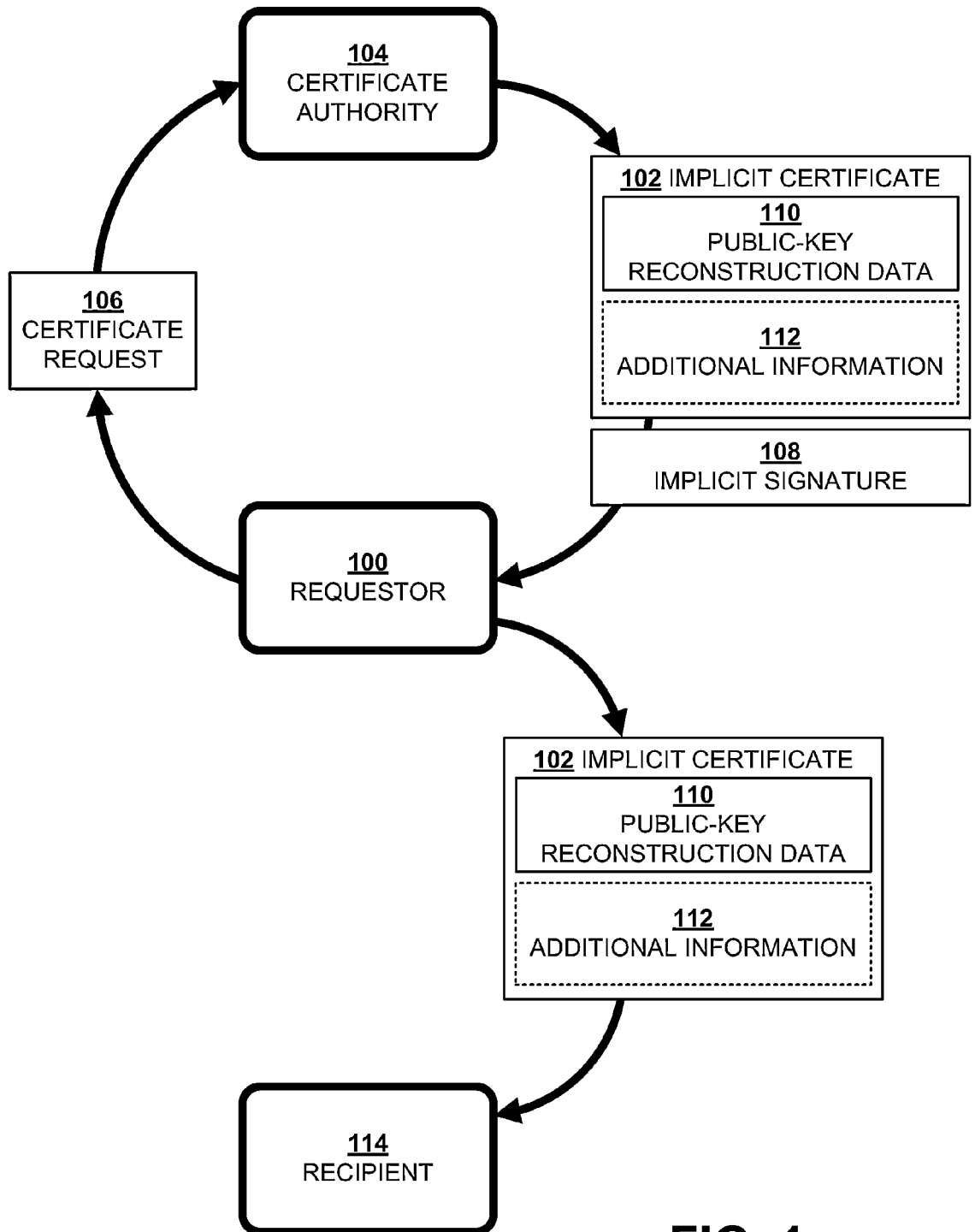
FIG. 1 is a simplified block diagram of an example implicit certificate scheme for a requestor, a certificate authority and a recipient.

ECC offers an advantage over other cryptographic algorithms, such as DSA and RSA, in that it uses smaller cryptographic values to provide roughly the same level of security. For example, an ECDSA public key that is 160 bits can provide roughly the same level of security as a DSA public key that is 1024 bits. The use of smaller-sized cryptographic values means that related computations require less processing power or less time or both. This makes ECC-based protocols of interest for application environments where resources such as bandwidth, computing power, and storage, are limited.

ECC-based protocols rely on the intractability of the elliptic curve discrete logarithm problem. Given publicly-known points G and Q on an elliptic curve E, where point Q is equal to a product of a scalar multiplying factor d and point G, that is Q=dG, it is conjecturally very difficult to determine scalar multiplying factor d. With known algorithms, the computational difficulty of solving this problem increases exponentially with the size of the subgroup generated by G.

To implement an ECC-based protocol, all participants must agree on the domain parameters of the elliptic curve. An elliptic curve E defined over a prime finite field $\mathbb{F}_p$, that is E($\mathbb{F}_p$), is defined by elliptic curve domain parameters D=(p, a, b, G, n, h), where p is an odd prime number that represents the number of elements in the field, integers a and b are elements of prime finite field $\mathbb{F}_p$ that that satisfy, for example, $4a^3 + 27b^2 \neq 0 \pmod{p}$, (however curves specified by another equation may be suitable), G is a base point on elliptic curve E($\mathbb{F}_p$) that has order n, where n is defined as the smallest positive prime number such that a product of prime number n and base point G is equal to a point at infinity O, that is nG=O, and cofactor h is defined as a ratio of the number of points #E($\mathbb{F}_p$)

on elliptic curve $E(\mathbb{F}_p)$ over prime number n, that is $h=\#E(\mathbb{F}_p)/n$. (Alternatively, elliptic curve E could be defined over a characteristic 2 finite field $\mathbb{F}_{2^m}$, where m is a prime number that is greater than or equal to one, that is m≥1.) Arithmetic in subgroups of $E(\mathbb{F}_p)$ may be written additively, where the sum of two points P and Q is P+Q, and scalar multiplication by an integer k is kP. Further details of existing ECC-based protocols are described in "Standards for Efficient Cryptography SEC1: Elliptic Curve Cryptography", Certicom Research, Certicom Corp., 2000, and "Standards for Efficient Cryptography SEC2: Recommended Elliptic Curve Domain Parameters version 2.0", Certicom Research, Certicom Corp., 2000.

In addition to satisfying $4a^3+27b^2 \neq 0 \pmod{p}$, elliptic curve domain parameters D may need to satisfy other constraints for cryptographic applications. For example, elliptic curve domain parameters D should be generated such that the number of points $\#E(\mathbb{F}_p)$ on elliptic curve $E(\mathbb{F}_p)$ is not equal to the number of elements in prime finite field $\mathbb{F}_p$, that is $\#E(\mathbb{F}_p) \neq p$, and such that odd prime p raised to any integer B, where 1≤B≤20, is not equal to one modulo prime number n, that is $p^B \neq 1 \pmod{n}$. Elliptic curve domain parameters D should also be generated such that cofactor h is small, specifically such that cofactor h is less than or equal to four, that is h≤4, and preferably such that cofactor h is equal to one, that is h=1. Recommended elliptic curve domain parameters D are published by standard bodies, such as the National Institute of Standards and Technology (NIST).

Once participants have agreed on the domain parameters of an elliptic curve, they can implement ECC-based protocols. Examples of ECC-based protocols include the Elliptic Curve Diffie-Hellman (ECDH) key agreement scheme, the Elliptic Curve Menezes-Qu-Vanstone (ECMQV) key agreement scheme, the Elliptic Curve Integrated Encryption Scheme (ECIES) public-key encryption scheme, and the previously mentioned ECDSA signature scheme.

Perhaps the simplest example of an ECC-based protocol is the generation of an elliptic curve key pair. Given valid elliptic curve domain parameters D=(p, a, b, G, n, h) associated with an elliptic curve E, an elliptic curve key pair (d, Q) can be generated using the following procedure. First, an integer d is randomly or pseudo-randomly selected within an interval [1, n−1]. Next, integer d is used in a scalar multiplication of base point G to obtain a new point Q on elliptic curve E, such that Q=dG. Scalar multiplication of a point on an elliptic curve, also known as point multiplication, can be computed efficiently using the addition rule with the double-and-add algorithm or one of its variants. These rules are known to those of ordinary skill in the art. Upon determining point Q, the pair (d, Q) can be used as a key pair, where integer d is a private key and point Q is a public key. While the point multiplication used to calculate public key Q from private key d and base point G is relatively straightforward, the inverse of this operation is extremely difficult. In general, ECC-based protocols rely on the difficulty of this operation.

Generation of a key pair, such as private key d and public key Q as described above, can be done either by a single device with which the key pair is associated, by a trusted third party such as a CA, or interactively between the CA and the device. A key pair can be interactively generated, for example, during the generation of an implicit certificate.

Similarly to a conventional or 'explicit' certificate, an implicit certificate binds public key information to its legitimate owner to provide identity authentication. However, in contrast to an explicit certificate, an implicit certificate does not explicitly contain a public key of the requestor of the implicit certificate. Instead, it contains data that may be used in conjunction with a public key of the CA to reconstruct a public key of the requestor. It should be noted that, while the examples presented herein may refer to "the CA's private key" or "the requestor's public key", for example, it is contemplated that each entity involved in a cryptographic scheme may have more than one public-private key pair. For clarity, only the key pairs that are relevant to the current framework are discussed.

Implicit certificates are generally smaller than explicit certificates and have fewer operational costs because some calculations that are typically performed independently in an explicit certificate scheme can be combined in an implicit certificate scheme. This makes implicit certificates particularly suited to application environments where resources such as bandwidth, computing power, and storage, are limited. One example of an implicit certificate scheme is the ECQV scheme.

In addition to the public-key reconstruction data contained in an implicit certificate, the implicit certificate also comprises additional information. This additional information may be related to, for example, one or more of the implicit certificate, the requestor of the implicit certificate, or the public key that is to be computed from the public-key reconstruction data. This additional information contributes to the size of the implicit certificate.

A framework is herein proposed whereby, during the generation of an implicit certificate by a certificate authority, information is incorporated in the public-key reconstruction data of the implicit certificate. This information may be related to, for example, one or more of the implicit certificate, a requestor of the implicit certificate, or the public key that is to be computed from the public-key reconstruction data. This information may comprise a validity period of the implicit certificate or a validity date of the implicit certificate or both.

If a portion of the information to be incorporated in the public-key reconstruction data is a portion that would normally contribute to the additional information of the implicit certificate, the overall size of the implicit certificate can be reduced because the size of the additional information can be reduced by the portion that is incorporated in the public-key reconstruction data. If all of the information that would normally contribute to the additional information of the implicit certificate is incorporated in the public-key reconstruction data, the size of the implicit certificate can be reduced to the size of the public-key reconstruction data alone, since no separate additional information would be required. A reduction in the size of the implicit certificate may reduce one or more of the requirements for bandwidth, computing power, and storage. Thus, at a one-time computational cost to the CA during the generation of the implicit certificate, subsequent costs associated with the use of the certificate may be reduced.

The proposed framework can be applied to the automatic renewal of certificates. The framework may also be modified for use in other cryptographic schemes, both ECC-based and non-ECC based, including digital signature protocols.

In the following examples, it may be assumed, unless otherwise stated, that all participants in a cryptographic scheme have agreed on suitable domain parameters. For example, for a scheme instantiated using a group of points on an elliptic curve, the participants agree on the corresponding elliptic curve domain parameters D=(p, a, b, G, n, h) as described above. Furthermore, in the case of certificate schemes or digital signature schemes, it may be assumed that all participants are in possession of the relevant public key of the CA or the signer, respectively. It may be assumed, unless otherwise stated, that implicit certificates are generated according to the ECQV implicit certificate scheme.

FIG. 1 is a simplified block diagram of an example implicit certificate scheme involving a requestor 100 of an implicit certificate 102, a CA 104, and a recipient 114. Recipient 114 is also known as a certificate processor 114. CA 104 has a public key $K_{CA}$ and a private key $k_{CA}$, where public key $K_{CA}$ of CA 104 is equal to a product of private key $k_{CA}$ of CA 104 and base point G, that is $K_{CA}=k_{CA}G$, where G is a base point on elliptic curve E. The generation of implicit certificate 102 may be initiated when requestor 100 sends a certificate request 106 to CA 104. First, requestor 100 generates a random or pseudo-random integer $d_A$ in an interval [1, n−1]. Integer $d_A$ is a private value of requestor 100 that should not be disclosed to other entities. Requestor 100 then calculates a public value $Q_A$ as a product of private value $d_A$ and base point G, that is $Q_A=d_AG$. Requestor 100 proceeds to send request 106 for an implicit certificate to CA 104, where certificate request 106 includes public value $Q_A$ of requestor 100 and information regarding the identity of requestor 100.

Upon receipt of certificate request 106, CA 104 proceeds to format, or encode, implicit certificate 102. CA 104 also generates an implicit signature 108 of implicit certificate 102 using private key $k_{CA}$ of CA 104, such that implicit signature 108 can later be used by requestor 100 to compute a private key of requestor 100. For this reason, implicit signature 108 is also known as private-key reconstruction data. Implicit certificate 102 contains public-key reconstruction data 110 which may be used in conjunction with public key $K_{CA}$ of CA 104 to calculate the public key of requestor 100. Implicit certificate 102 also contains additional information 112 which may be related to, for example, one or more of requestor 100, implicit certificate 102, or a public key of requestor 100 that is to be calculated from public-key reconstruction data 110. Following the formatting of implicit certificate 102, CA 104 sends implicit certificate 102 and implicit signature 108 to requestor 100, which may then use them to calculate a key pair consisting of the private key of requestor 100 and the public key of requestor 100. Requestor 100 may subsequently send implicit certificate 102 to recipient 114 so that recipient 114 can calculate the public key of requestor 100. Alternatively, recipient 114 may obtain implicit certificate 102 directly from CA 104 (not shown).

Figure 2:
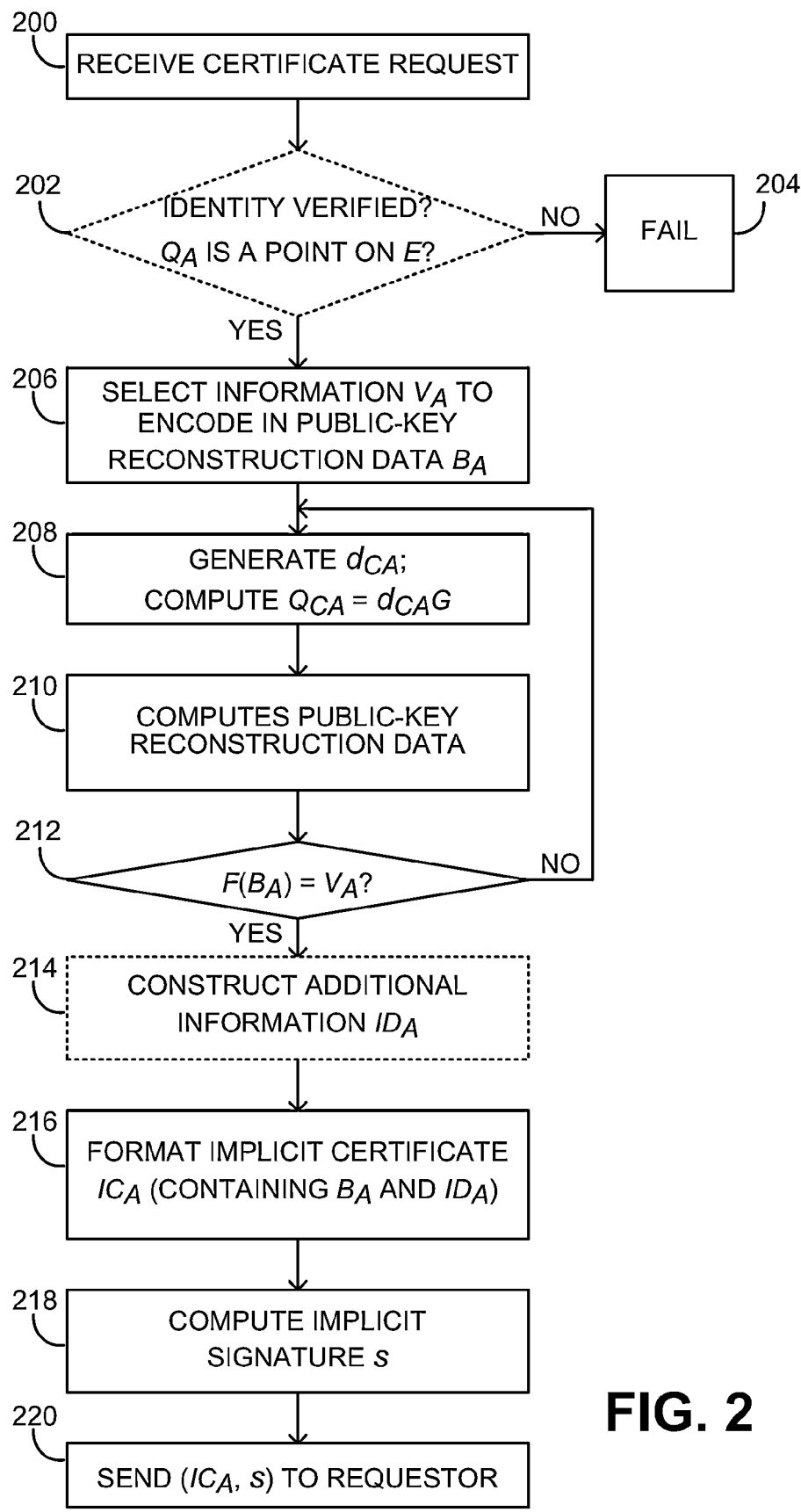
FIG. 2 is a simplified flowchart of an example method to be performed by a certificate authority for incorporating information in public-key reconstruction data of an implicit certificate.

FIG. 2 is a simplified flowchart of an example method to be performed by a CA, such as CA 104, for incorporating information in public-key reconstruction data of an implicit certificate, such as implicit certificate 102. At 200, the CA receives a request from a requestor, such as requestor 100, for an implicit certificate $IC_A$. At 202, the CA optionally checks the validity of the received information in the certificate request, including the identity of the requestor and public value $Q_A$ of the requestor. If one or both of these optional verifications fails, the method may end in failure at 204. For example, if the CA determines that public value $Q_A$ of the requestor is not a point on elliptic curve E whose elliptic curve domain parameters D have been agreed upon by the CA and the requestor, the method may end in failure at 204.

If both the identity of the requestor and public value $Q_A$ of the requestor are successfully verified at 202 or if the optional verification is skipped, the CA proceeds to 206, where it selects information $V_A$ to be incorporated in public-key reconstruction data $B_A$, where public-key reconstruction data $B_A$ is to be part of implicit certificate $IC_A$. Information $V_A$ may be related to, for example, one or more of implicit certificate $IC_A$, the requestor of implicit certificate $IC_A$, or a public key $K_A$ of the requestor that is to be computed from public-key reconstruction data $B_A$. For example, information $V_A$ may include identity information that was received along with public value $Q_A$ from the requestor. Information $V_A$ may comprise a validity period of implicit certificate $IC_A$ or a validity date of implicit certificate $IC_A$ or both. It is expected that information $V_A$ is from a relatively small set, for example, a set of cardinality $<2^{32}$. In practice, the cardinality is limited by the computational capability of the CA to handle the processing required to determine public-key reconstruction data $B_A$ that incorporates information $V_A$.

At 208, the CA generates a random or pseudo-random integer $d_{CA}$ in an interval [1, n−1], where integer $d_{CA}$ is a private value of the CA that should not be disclosed to other entities. From private value $d_{CA}$ of the CA, the CA calculates a public value $Q_{CA}$ that is equal to a product of private value $d_{CA}$ of the CA and base point G, that is $Q_{CA}=d_{CA}G$, where G is the base point on elliptic curve E that was used during the calculation of public value $Q_A$ of the requestor, as described with respect to FIG. 1.

At 210, the CA calculates public-key reconstruction data $B_A$ as a sum of public value $Q_A$ of the requestor and public value $Q_{CA}$ of the CA, that is $B_A=Q_A+Q_{CA}$. At 212, the CA checks whether application of a known function F to public-key reconstruction data $B_A$ results in information $V_A$, that is $F(B_A)=V_A$. Numerous functions F are contemplated. As a simple example, function F could extract a subset of the bits from public-key reconstruction data $B_A$, such as the first 20 bits or the last 20 bits of 160-bit public-key reconstruction data $B_A$, for example. Alternatively, a more complicated function F could be used, such as a decompression algorithm or a function that adds certain bits of public-key reconstruction data $B_A$ together. Regardless of how function F is defined, it must be agreed on by all entities involved in the ECC-based protocol if information $V_A$ is to be incorporated in public-key reconstruction data $B_A$ and extracted from public-key reconstruction data $B_A$ at some later point in time.

Returning to the example method illustrated in FIG. 2, if the CA determines at 212 that application of function F to public-key reconstruction data $B_A$ does not result in information $V_A$, that is $F(B_A) \neq V_A$, then the CA returns to 208, generating a new private value 'new $d_{CA}$' and calculating a corresponding new public value $Q_{CA}$, that is 'new QCA'='new $d_{CA}$'G. Then the CA proceeds at 210 to calculate new public-key reconstruction data $B_A$ from new public value $Q_{CA}$, that is 'new $B_A$'=$Q_A$+'new $Q_{CA}$', and determines at 212 whether application of function F to new public-key reconstruction data $B_A$ results in information $V_A$, that is F('new $B_A$')=$V_A$. This process of determining public-key reconstruction data $B_A$ by generating a new private value $d_{CA}$ and calculating a corresponding new public value $Q_{CA}$ and new public-key reconstruction data $B_A$ is repeated until the CA determines at 212 that information $V_A$ can be obtained by applying function F to public-key reconstruction data $B_A$. Upon this determination, the CA proceeds at 214 to construct additional information $ID_A$, in the event that particular information $V_A$ does not already include all the information to be included in implicit certificate $IC_A$. Additional information $ID_A$ may include data that is not already included in information $V_A$. For example, additional information $ID_A$ may include information related to one or more of implicit certificate $IC_A$, the requestor of implicit certificate $IC_A$, or public key $K_A$ of the requestor that is to be computed from public-key reconstruction data $B_A$. Additional information $ID_A$ may include a validity period of implicit certificate $IC_A$ or a validity date of implicit certificate $IC_A$ or both.

At 216, the CA formats, or encodes, implicit certificate $IC_A$ such that implicit certificate $IC_A$ contains public-key reconstruction data $B_A$ and additional information $ID_A$ encoded in a reversible manner For example, public-key reconstruction data $B_A$ and additional information $ID_A$ could be concatenated, that is $B_A \| ID_A$. To ensure that the concatenation is reversible even when the concatenated values are of variable length, it is contemplated that encoding of public-key reconstruction data $B_A$ and additional information $ID_A$ in a reversible manner could be done using ASN.1 as described by Brown in "Standards for Efficient Cryptography SEC 1: Elliptic Curve Cryptography", Certicom Corp., May 21, 2009. This involves the use of nested bit strings of the form TLV, where T is a short string indicating a type, L is a string indicating the length of next field V, and V is a value which can itself contain other TLVs. Therefore, to reversibly encode public-key reconstruction data $B_A$ and additional information $ID_A$, it is contemplated that one could use one outer TLV whose tag indicates that it is a sequence of values, and two inner TLVs that are included as part of the outer V field. It is primarily the length indicators that ensure the encoding is reversible.

At 218, the CA calculates an implicit signature s, for example, according to equation 1:

$$s = \text{Hash}(IC_A) d_{CA} + k_{CA} \pmod{n} \quad (1)$$

where Hash is a cryptographic hash function, such as, for example, the Secure Hash Algorithm 1 (SHA-1) or any of the SHA2 functions, for example SHA-256. Regardless of which hash function is used, it must be agreed on by all entities involved in the ECC-based protocol. Although not explicitly shown, $\text{Hash}(IC_A)$ is converted to an integer for use in equation 1.

At 220, the CA sends implicit certificate $IC_A$ and implicit signature s to the requestor. Although not explicitly shown, the CA may make implicit certificate $IC_A$ directly available to another entity, for example, a recipient, also known as a certificate processor. This may be accomplished, for example, by making implicit certificate $IC_A$ available for download from a website hosted by the CA, or by broadcast transmission of implicit certificate $IC_A$ to relevant devices.

Figure 3:
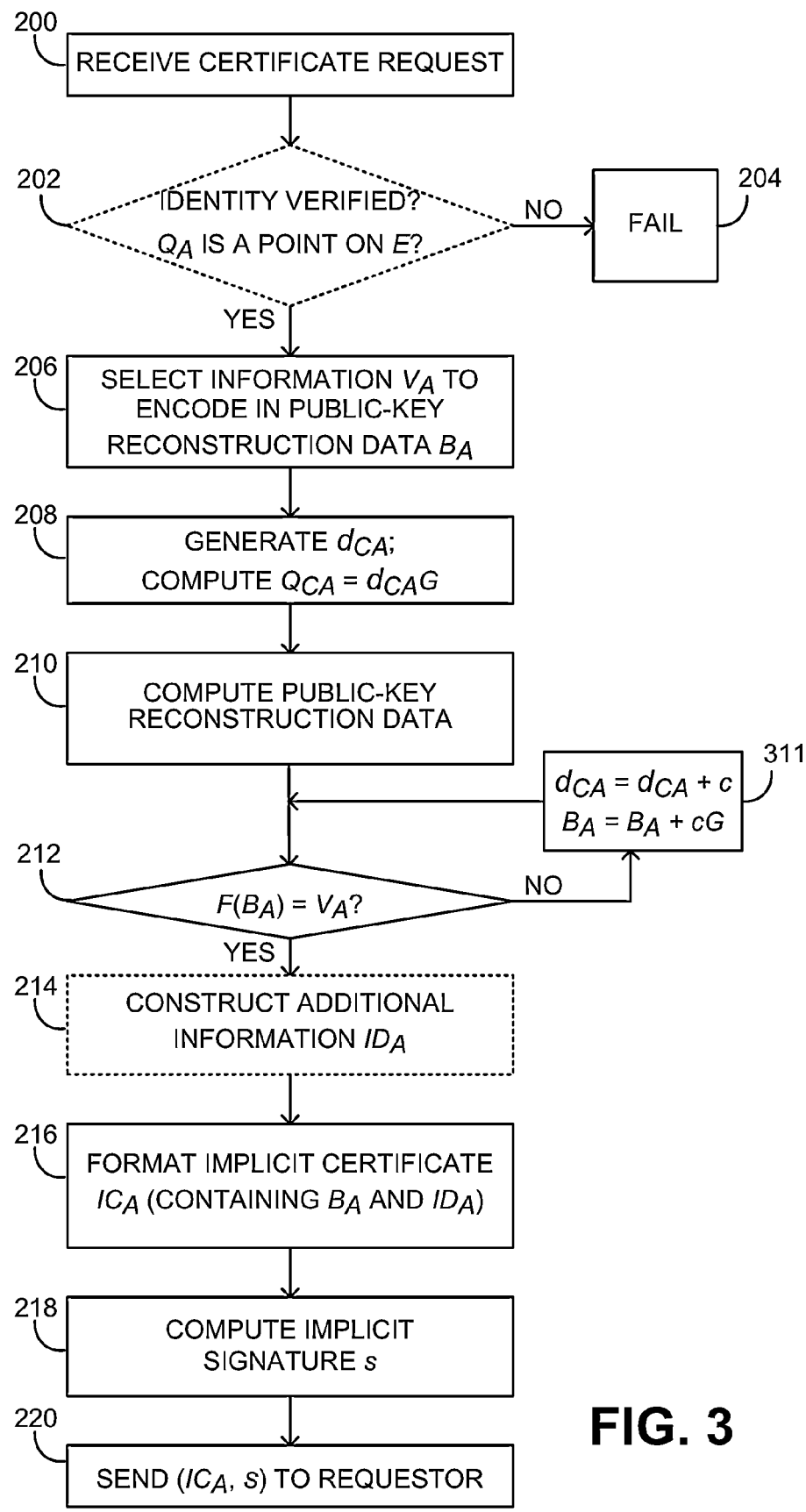
FIG. 3 is a simplified flowchart of another example method to be performed by a certificate authority for incorporating information in public-key reconstruction data of an implicit certificate.

FIG. 3 is a simplified flowchart of another example method to be performed by a CA, such as CA 104, for incorporating information in public-key reconstruction data of an implicit certificate, such as implicit certificate 102. This method includes a more efficient means of searching for public-key reconstruction data that incorporates selected information $V_A$.

As described above with respect to FIG. 2, the example method illustrated in FIG. 3 includes receipt of an implicit certificate request at 200, optional verification of the requestor's identity and public value $Q_A$ of the requestor at 202 (followed by the method ending in failure at 204 if the verification fails), selection of information $V_A$ to be incorporated in public-key reconstruction data $B_A$ at 206, generation of private value $d_{CA}$ of the CA and public value $Q_{CA}$ of the CA at 208, and calculation of public-key reconstruction data $B_A$ at 210. However, in this method, if the CA determines at 212 that application of known function F to public-key reconstruction data $B_A$ does not result in information $V_A$, that is $F(B_A) \neq V_A$, then, rather than returning to 208 to generate a new private value $d_{CA}$, the CA proceeds at 311 to increment private value $d_{CA}$ by a constant integer c, that is 'new $d_{CA}$' = 'old $d_{CA}$' + c. Accordingly, public-key reconstruction data $B_A$ is incremented by the product of constant c and base point G, that is 'new $B_A$' = 'old $B_A$' + cG. An example for the constant c is the value one, that is c=1, 'new $d_{CA}$' = 'old $d_{CA}$' + 1, and 'new R' = 'old R' + G. The CA then proceeds at 212 to check again if application of function F to new public-key reconstruction data $B_A$ results in information $V_A$, that is F('new $B_A$') = $V_A$. Incrementing private value $d_{CA}$ of the CA and public-key reconstruction data $B_A$ has the advantage that the CA may avoid performing a separate and lengthier computation of public value $Q_{CA}$, which requires the use of different point multiplication in each iteration. This may reduce the amount of computation time or computation power or both that is required to determine public-key reconstruction data $B_A$ that satisfies the requirement that application of function F to public-key reconstruction data $B_A$ results in information $V_A$, that is $F(B_A) = V_A$.

Once the CA determines at 212 that application of function F to public-key reconstruction data $B_A$ results in information $V_A$, that is $F(B_A) = V_A$, the CA proceeds, as illustrated in the example method of FIG. 2, to construct additional information $ID_A$ at 214, to format implicit certificate $IC_A$ at 216, to calculate implicit signature s at 218, for example, according to equation 1, and to send implicit certificate $IC_A$ and implicit signature s to the requestor at 220. As noted above, it is also contemplated that the CA may make implicit certificate $IC_A$ directly available to another entity, for example, a recipient.

Figure 4:
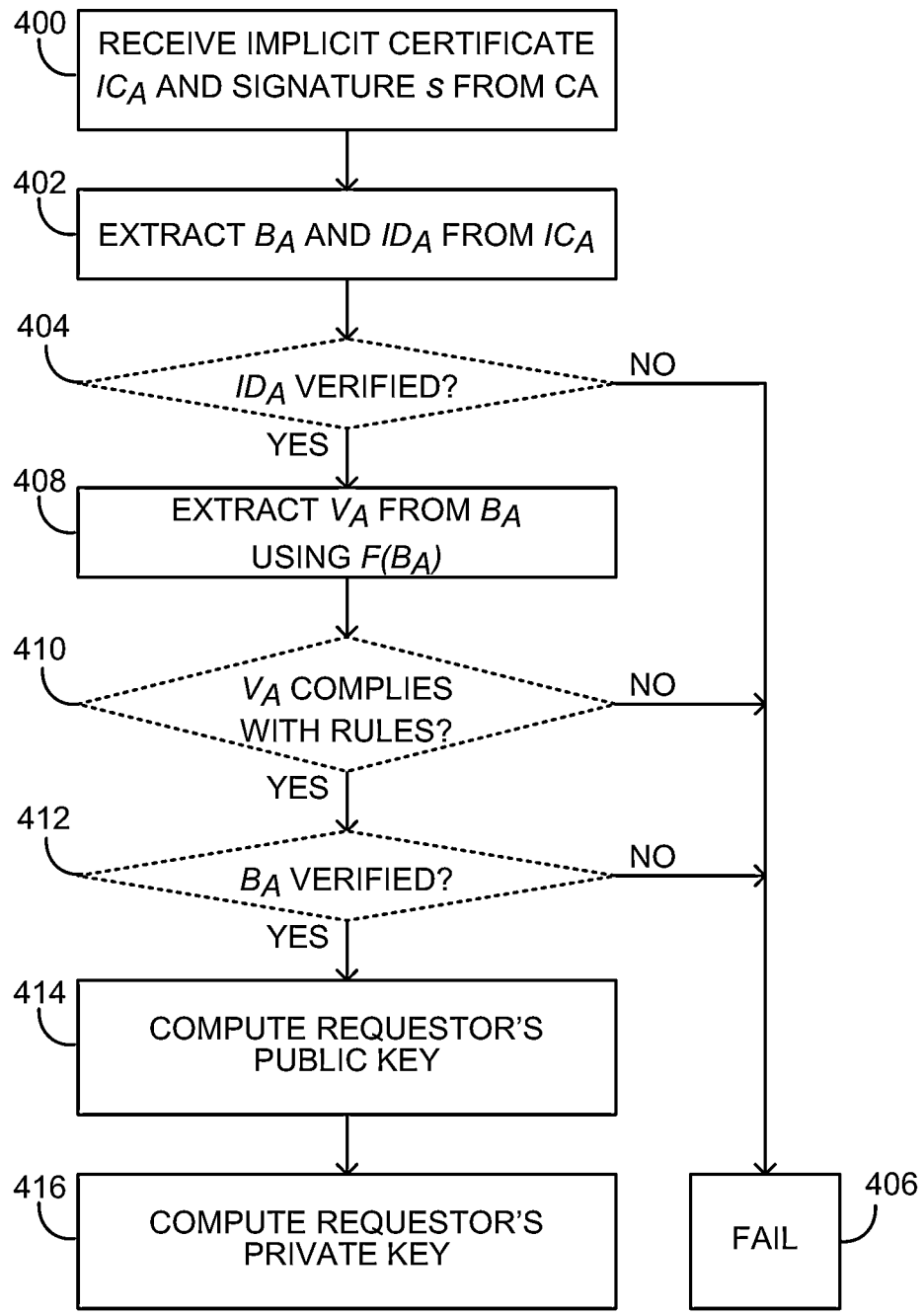
FIG. 4 is a simplified flowchart of an example method to be performed by a requestor of an implicit certificate for extracting information from public-key reconstruction data contained in the implicit certificate and for computing a public key of the requestor and a private key of the requestor.

FIG. 4 is a simplified flowchart of an example method to be performed by a requestor, such as requestor 100, of an implicit certificate, such as implicit certificate 102, for extracting information from public-key reconstruction data contained in the implicit certificate and for computing a public key of the requestor and a private key of the requestor. At 400, the requestor receives an implicit certificate $IC_A$ and an implicit signature s from a CA, such as CA 104 in FIG. 1, where implicit certificate $IC_A$ has been formatted as described with respect to FIG. 2 or FIG. 3 and implicit signature s has been calculated, for example, according to equation 1. At 402, the requestor extracts public-key reconstruction data $B_A$ and additional information $ID_A$ from implicit certificate $IC_A$. This is possible because public-key reconstruction data $B_A$ and additional information $ID_A$ were reversibly encoded in implicit certificate $IC_A$ during formatting by the CA as described above. Once the requestor has extracted public-key reconstruction data $B_A$ and additional information $ID_A$, the requestor may optionally verify the contents of additional information $ID_A$ at 404. If additional information $ID_A$ cannot be successfully verified, the method may end in failure at 406. If the verification of $ID_A$ is successful or if the optional verification is skipped, at 408 the requestor extracts information $V_A$ from public-key reconstruction data $B_A$ by applying the known function F to public-key reconstruction data $B_A$. The requestor optionally checks at 410 whether information $V_A$ complies with certificate policy management rules known to or accessible by the requestor. If the requestor determines that information $V_A$ does not comply with the known certificate policy management rules, the method may end in failure at 406. If the requestor determines that information $V_A$ complies with the known certificate policy management rules or if the optional check of information $V_A$ is skipped, the requestor may optionally proceed to verify public-key reconstruction data $B_A$ at 412. If public-key reconstruction data $B_A$ cannot be successfully verified, for example, because public-key reconstruction data $B_A$ is not a valid point on elliptic curve E, the method may end in failure at 406. However, if the verification of public-key reconstruction data $B_A$ is successful or if the optional check of public-key reconstruction data $B_A$ is skipped, the requestor proceeds to calculate a public key $K_A$ of the requestor at 414 according to equation 2:

$$K_A = \text{Hash}(IC_A) \cdot B_A + K_{CA} \quad (2)$$

where Hash is the same cryptographic hash function that was used in the calculation of implicit signature s, for example, in equation 1. As in equation 1, $\text{Hash}(IC_A)$ is converted to an integer for use in equation 2. It is assumed that the requestor is in possession of an authenticated copy of public key $K_{CA}$ of the CA. The requestor may also calculate private key $k_A$ of the requestor at 416, for example, according to equation 3:

$$k_A = \text{Hash}(IC_A) \cdot d_A + s \pmod{n} \qquad (3)$$

where Hash is the same cryptographic hash function that was used in the calculation of implicit signature s, for example, in equation 1 and the calculation of public key $K_A$ of the requestor in equation 2. As in equation 1, Hash($IC_A$) is converted to an integer for use in equation 3. While public key $K_A$ is shown to be computed prior to private key $k_A$ in the example method illustrated in FIG. 4, it is contemplated that the computations at 414 and 416 may be performed in a different order than that illustrated in FIG. 4, while still yielding the same results. Similarly, it is contemplated that the optional verifications at 404, 410 and 412 may be performed in a different order than that illustrated in FIG. 4, while still yielding the same results.

The requestor may send implicit certificate $IC_A$ to another entity, denoted a recipient, so that the recipient can compute the requestor's public key $K_A$. Alternatively, the recipient may obtain implicit certificate $IC_A$ directly from the CA. The recipient may then implicitly authenticate the requestor's public key $K_A$ by using it, for example, in a digital signature algorithm or to encrypt information that it wants to send to the requestor.

Figure 5:
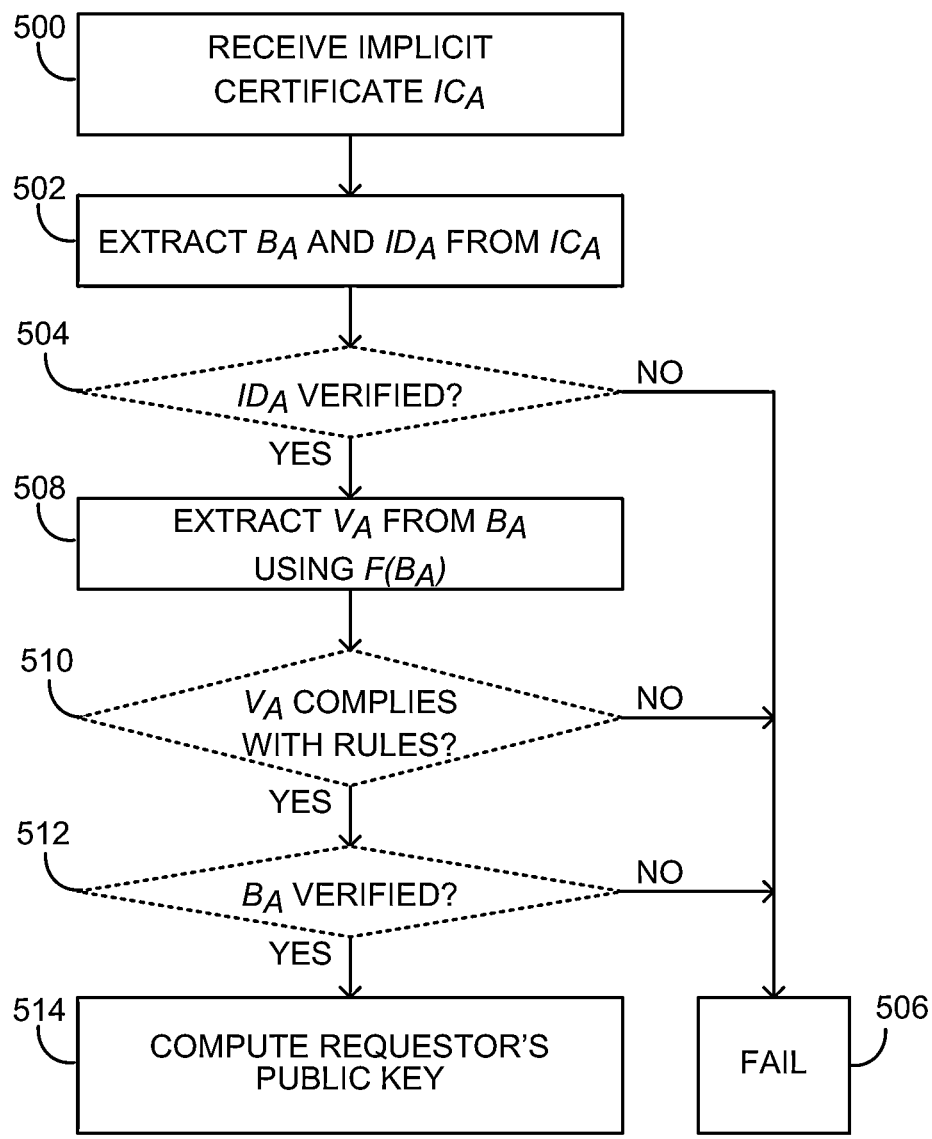
FIG. 5 is a simplified flowchart of an example method to be performed by a recipient of an implicit certificate for extracting information from public-key reconstruction data contained in the implicit certificate and for computing a public key of a requestor of the implicit certificate.

FIG. 5 is a simplified flowchart of an example method to be performed by a recipient, such as recipient 114, of an implicit certificate, such as implicit certificate 102, for extracting information from public-key reconstruction data contained in the implicit certificate and for computing a public key of a requestor of the implicit certificate. At 500, the recipient receives an implicit certificate $IC_A$, where implicit certificate $IC_A$ has been formatted as described above with respect to FIG. 2 or FIG. 3. At 502, the recipient extracts public-key reconstruction data $B_A$ and additional information $ID_A$ from implicit certificate $IC_A$. This is possible because public-key reconstruction data $B_A$ and additional information $ID_A$ were reversibly encoded in implicit certificate $IC_A$ during formatting by the CA as described above. Once the recipient has extracted public-key reconstruction data $B_A$ and additional information $ID_A$, the recipient may optionally verify the contents of additional information $ID_A$ at 504. If additional information $ID_A$ cannot be successfully verified, the method may end in failure at 506. If the verification of additional information $ID_A$ is successful or if the optional check of additional information $ID_A$ is skipped, at 508 the recipient extracts information $V_A$ from public-key reconstruction data $B_A$ by applying the known function F to public-key reconstruction data $B_A$. The recipient optionally checks at 510 whether information $V_A$ complies with certificate policy management rules known to or accessible by the recipient. If the recipient determines that application of function F to public-key reconstruction data $B_A$ results in information $V_A$ that does not comply with the known certificate policy management rules, the method may end in failure at 506. If the recipient determines that information $V_A$ complies with the known certificate policy management rules or if the optional check of information $V_A$ is skipped, the recipient may optionally proceed to verify public-key reconstruction data $B_A$ at 512. If public-key reconstruction data $B_A$ cannot be successfully verified, for example, because public-key reconstruction data $B_A$ is not a valid point on elliptic curve E, the method may end in failure at 506. However, if the verification of public-key reconstruction data $B_A$ is successful or if the optional check of public-key reconstruction data $B_A$ is skipped, the recipient proceeds to compute public key $K_A$ of the requestor at 514. This may be done using equation 2, assuming that the recipient is in possession of an authenticated copy of public key $K_{CA}$ of the CA.

It is contemplated that the optional verifications at 504, 510 and 512 may be performed in a different order than that illustrated in FIG. 5, while still yielding the same results.

Various examples for meaningful particular information $V_A$ have been described. Many iterations may need to be performed during generation of an implicit certificate before public-key reconstruction data is determined that satisfies the requirement that applying known function F to the public-key reconstruction data results in the particular information. However, the number of iterations may be reduced if, instead of meaningful particular information, the only requirement is that particular information $V_A$ is a value not previously incorporated in public-key reconstruction data of implicit certificates issued by the same CA. Such information $V_A$ effectively serves as a certificate identifier unique in the space of implicit certificates issued by the same CA.

In an extension of the proposed framework, a CA may automatically renew an implicit certificate without receiving a renewal request. For example, if an original implicit certificate $IC_A$ is formatted with a validity period of one year, the CA could issue a renewed implicit certificate $IC_A$ to the requestor every year in advance of the anniversary of the initial enrollment. In this case, the CA would have close to one year to take the original certificate request and corresponding output from the original certificate fulfillment and to determine new public-key reconstruction data $B_A$ that satisfies the requirement that application of a known function F to new public-key reconstruction data $B_A$ results in new information $V_A$, that is F('new $B_A$')='new $V_A$', where new information $V_A$ is or includes, for example, an updated validity date for a renewed implicit certificate $IC_A$. Once new public-key reconstruction data $B_A$ is found that satisfies these requirements, the CA could store renewed implicit certificate $IC_A$ and an associated renewed implicit signature s until the anniversary approaches, at which point the CA could send renewed implicit certificate $IC_A$ and renewed implicit signature s to the requestor. The requestor would then proceed to compute a renewed private key $k_A$ of the requestor corresponding to new public-key reconstruction data $B_A$, where new public-key reconstruction data $B_A$ is reversibly encoded in renewed implicit certificate $IC_A$, as previously described.

In order for the requestor to calculate renewed private key $k_A$ of the requestor, equation 3 requires that the requestor must have stored either an original private value $d_A$ that it used to calculate original public value $Q_A$ sent to the CA during its original certificate request, or an original implicit signature s corresponding to original implicit certificate $IC_A$. In the case that the requestor did not store original private value $d_A$ but did store original signature s, the requestor could solve for original private value $d_A$ by rearranging equation 1 and substituting the values of original signature s, original implicit certificate $IC_A$ and original private key $k_A$. Once in possession of original private value $d_A$, the requestor could use renewed implicit certificate $IC_A$ and renewed implicit signature s to compute renewed private key $k_A$ of the requestor.

There may be cases where function F, when applied to particular public-key reconstruction data $B_A$, may never yield selected information $V_A$. In these cases a hash function could be applied to public-key reconstruction data $B_A$ prior to applying function F. This hash function need not be the same hash function used in the ECQV scheme itself. For example, application of function F to public-key reconstruction data $B_A$, that is F($B_A$), at 212 in FIGS. 2 and 3, at 408 in FIG. 4, and at 508 in FIG. 5, could be replaced by application of function F to a hash of public-key reconstruction data $B_A$, that is F(Hash($B_A$)). This would provide the CA with a new set of values for comparison with information $V_A$, which may improve the likelihood that a match will be found, that is F(Hash($B_A$))=$V_A$. However, it should be noted that the other entities involved in the protocol must also be aware when a hash function is being used. Alternatively, information $V_A$ could be selected so as to avoid the degenerate cases where application of function F never yields information $V_A$.

Figure 6:
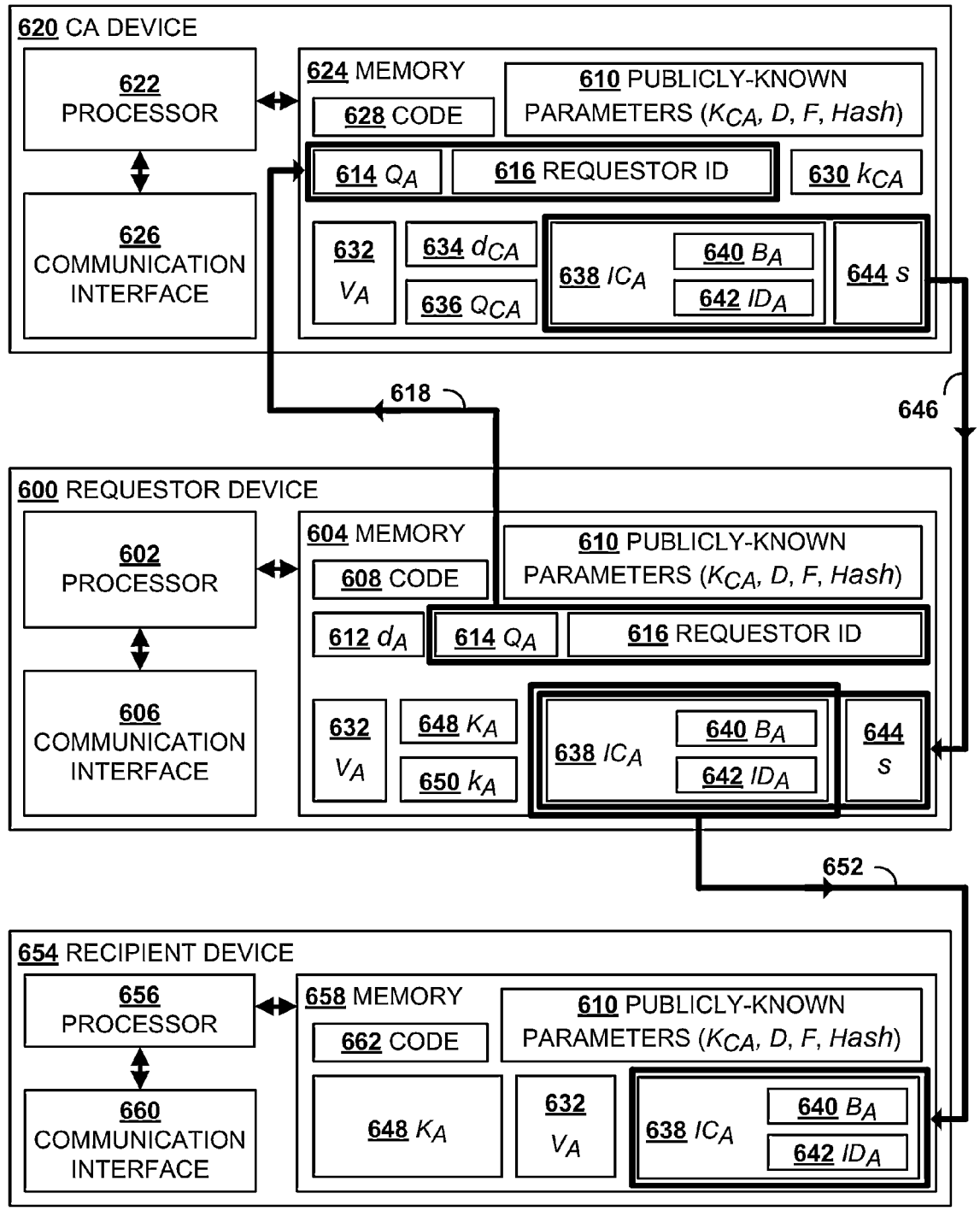
FIG. 6 is a simplified block diagram of a requestor device, a certificate authority device, and a recipient device.

FIG. 6 is a simplified block diagram of a requestor device 600, a CA device 620, and a recipient device 654.

Requestor device 600 is an example of requestor 100 and is able to perform the example method illustrated in FIG. 4. Requestor device 600 comprises a processor 602 which is coupled to a memory 604 and to a communication interface 606. Requestor device 600 may contain other elements which, for clarity, are not shown in FIG. 6.

CA device 620 is an example of certificate authority 104 and is able to perform one or both of the example methods illustrated in FIGS. 2 and 3. CA device 620 comprises a processor 622 which is coupled to a memory 624 and to a communication interface 626. CA device 620 may contain other elements which, for clarity, are not shown in FIG. 6.

Recipient device 654 is an example of recipient 114 and is able to perform the example method illustrated in FIG. 5. Recipient device 654 comprises a processor 656 which is coupled to a memory 658 and to a communication interface 660. Recipient device 654 may contain other elements which, for clarity, are not shown in FIG. 6.

Communication interfaces 606, 626, and 660 may be wired communication interfaces or wireless communication interfaces. For example, communication interfaces 606, 626, and 660 may be Universal Serial Bus (USB) interfaces, Ethernet interfaces, Integrated Services Digital Network (ISDN) interfaces, Digital Subscriber Line (DSL) interfaces, Local Area Network (LAN) interfaces, High-Definition Multimedia (HDMI) interfaces, Digital Visual Interfaces (DVIs), or Institute of Electrical and Electronics Engineers (IEEE) 1394 interfaces such as i.LINK™, Lynx$^{SM}$ or Firewire®. Alternatively, communication interfaces 606, 626, and 660 may be Wireless Local Area Network (WLAN) interfaces, short-range wireless communication interfaces such as Wireless Personal Area Network (WPAN) interfaces, or Wireless Wide Area Network (WWAN) interfaces.

Each of memories 604, 624, and 658 is able to store publicly-known parameters 610, including a public key $K_{CA}$ of CA device 620 as well as elliptic curve domain parameters D, function F, and hash function Hash that have been agreed on by requestor device 600, CA device 620 and recipient device 654.

Memory 604 of requestor device 600 is able to store code 608 that, when executed by processor 602, results in the example method illustrated in FIG. 4. Memory 604 may also store applications (not shown) installed in requestor device 600 to be executed by processor 602.

In addition to publicly-known parameters 610, memory 604 is also able to store a private value $d_A$ 612, a public value $Q_A$ 614, and a requestor identity 616 of requestor device 600. As denoted by arrow 618, public value $Q_A$ 614 and requestor identity 616 are able to be sent to CA device 620, where they may be stored in memory 624 of CA device 620. While not explicitly shown, public value $Q_A$ 614 and requestor identity 616 may be sent from requestor device 600 via communication interface 606 and may be received by CA device 620 via communication interface 626.

Memory 624 of CA device 620 is able to store code 628 that, when executed by processor 622, results in one or both of the example methods illustrated in FIGS. 2 and 3. Memory 624 may also store applications (not shown) installed in CA device 620 to be executed by processor 622.

Memory 624 is able to store a private key $k_{CA}$ 630 of CA device 620 that corresponds to public key $K_{CA}$ of CA device 620, as well as selected information $V_A$ 632, a private value $d_{CA}$ 634, and a public value $Q_{CA}$ 636. Memory 624 is also able to store an implicit certificate $I_{CA}$ 638 which contains reversibly-encoded public-key reconstruction data $B_A$ 640 and additional information $ID_A$ 642, as well as an implicit signature s 644.

As denoted by arrow 646, implicit certificate $I_{CA}$ 638 and implicit signature s 644 are able to be sent to requestor device 600, where they may be stored in memory 604 of requestor device 600. While not explicitly shown, implicit certificate $I_{CA}$ 638 and implicit signature s 644 may be sent from CA device 620 via communication interface 626 and may be received by requestor device 600 via communication interface 606.

Memory 604 of requestor device 600 is further able to store information $V_A$ 632, a public key $K_A$ 648 of requestor device 600 and a private key $k_A$ 650 of requestor device 600, where these values may be determined upon receipt of implicit certificate $IC_A$ 638 and implicit signature s 644 from CA device 620.

As denoted by arrow 652, implicit certificate $IC_A$ 638 is able to be sent to recipient device 654, where it may be stored in memory 658 of recipient device 654. While not explicitly shown, implicit certificate $IC_A$ 638 may be sent from requestor device 600 via communication interface 606 and may be received by recipient device 654 via communication interface 660. Alternatively, although not explicitly shown, implicit certificate $IC_A$ 638 may be obtained by recipient device 654 directly from the CA, for example, downloaded from a website hosted by the CA.

Memory 658 of recipient device 654 is able to store code 662 that, when executed by processor 656, results in the example method illustrated in FIG. 5. Memory 658 may also store applications (not shown) installed in recipient device 654 to be executed by processor 656.

Memory 658 is further able to store information $V_A$ 632 and public key $K_A$ 648 of requestor device 600, where these values may be determined upon receipt of implicit certificate $IC_A$ 638 from requestor device 600.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to be performed by a certificate authority as part of an implicit certificate scheme, the method comprising:
   receiving a certificate request from a requestor, the certificate request comprising a public value [$Q_A$] of the requestor;
   selecting particular information [$V_A$] from a finite set;
   performing an iterative process of generating a point [$B_A$] on an elliptic curve and applying a known function [F] to the point [$B_A$], wherein the iterative process is repeated until applying the known function [F] to the point [$B_A$] results in the particular information [$V_A$];
   encoding an implicit certificate [$IC_A$] using the point [$B_A$] as public-key reconstruction data [$B_A$]; and
   calculating an implicit signature [s] that corresponds to the implicit certificate [$IC_A$], wherein the iterative process comprises:
  generating a private value $[d_{CA}]$ of the certificate authority;
  multiplying the private value $[d_{CA}]$ of the certificate authority by a base point $[G]$ to obtain a public value $[Q_{CA}]$ of the certificate authority;
  calculating the public-key reconstruction data $[B_A]$ as a sum of the public value $[Q_A]$ of the requestor and the public value $[Q_{CA}]$ of the certificate authority; and
  determining whether applying the known function $[F]$ to the public-key reconstruction data $[B_A]$ results in the particular information $[V_A]$,
  wherein the public value $[Q_A]$ of the requestor, the base point $[G]$, and the public value $[Q_{CA}]$ of the certificate authority are on the elliptic curve.

2. The method as claimed in claim 1, further comprising: sending the implicit certificate $[IC_A]$ and the implicit signature $[s]$ to the requestor for use in calculating a reconstructed private key $[k_A]$ which forms a key pair with a public key $[K_A]$ that can be reconstructed from the public-key reconstruction data $[B_A]$.

3. The method as claimed in claim 1, further comprising: making the implicit certificate $[IC_A]$ available to a recipient for use in calculating a public key $[K_A]$ from the public-key reconstruction data $[B_A]$.

4. The method as claimed in claim 1, wherein the particular information $[V_A]$ is related to one or more of the requestor, the implicit certificate $[IC_A]$, and a public key $[K_A]$ that can be reconstructed from the public-key reconstruction data $[B_A]$.

5. The method as claimed in claim 1, wherein the particular information $[V_A]$ comprises a validity period of the implicit certificate $[IC_A]$ or a validity date of the implicit certificate $[IC_A]$ or both.

6. The method as claimed in claim 1, wherein in the event that applying the known function $[F]$ to the public-key reconstruction data $[B_A]$ does not result in the particular information $[V_A]$, the iterative process further comprises:
  generating a new private value [new $d_{CA}$] of the certificate authority;
  multiplying the new private value [new $d_{CA}$] of the certificate authority by the base point $[G]$ to obtain a new public value [new $Q_{CA}$] of the certificate authority;
  calculating new public-key reconstruction data [new $B_A$] as a sum of the public value $[Q_A]$ of the requestor and the new public value [new $Q_{CA}$] of the certificate authority; and
  determining whether applying the known function $[F]$ to the new public-key reconstruction data [new $B_A$] results in the particular information $[V_A]$,
  wherein the new public value [new $Q_{CA}$] of the certificate authority and the new public-key reconstruction data [new $B_A$] are on the elliptic curve.

7. The method as claimed in claim 1, wherein in the event that applying the known function $[F]$ to the public-key reconstruction data $[B_A]$ does not result in the particular information $[V_A]$, the iterative process further comprises:
  calculating an incremented private value $[d_{CA}+c]$ of the certificate authority as a sum of the private value $[d_{CA}]$ of the certificate authority and a constant integer $[c]$;
  calculating incremented public-key reconstruction data $[B_A+cG]$ as a sum of the public-key reconstruction data $[B_A]$ and a product of the constant integer $[c]$ and the base point $[G]$, wherein the incremented public-key reconstruction data $[B_A+cG]$ is on the elliptic curve; and
  determining whether applying the known function $[F]$ to the incremented public-key reconstruction data $[B_A+cG]$ results in the particular information $[V_A]$.

8. A method to be performed by a requestor as part of an implicit certificate scheme, the method comprising:
  sending a certificate request to a certificate authority;
  receiving from the certificate authority an implicit certificate $[IC_A]$ from which public-key reconstruction data $[B_A]$ is recoverable, wherein the public-key reconstruction data $[B_A]$ is on an elliptic curve and can be used to calculate a reconstructed public key $[K_A]$;
  receiving from the certificate authority an implicit signature $[s]$ that corresponds to the implicit certificate $[IC_A]$;
  recovering the public-key reconstruction data $[B_A]$ from the implicit certificate $[IC_A]$; and
  extracting information $[V_A]$ from the public-key reconstruction data $[B_A]$ by applying a known function $[F]$ to the public-key reconstruction data $[B_A]$, the known function $[F]$ having been agreed upon by the requestor and by the certificate authority for use by the certificate authority in incorporating the information $[V_A]$ into the public-key reconstruction data $[B_A]$.

9. The method as claimed in claim 8, wherein the extracted information $[V_A]$ is related to one or more of the requestor, the reconstructed public key $[K_A]$, and the implicit certificate $[IC_A]$.

10. The method as claimed in claim 8, wherein the extracted information $[V_A]$ comprises a validity period of the implicit certificate $[IC_A]$ or a validity date of the implicit certificate $[IC_A]$ or both.

11. The method as claimed in claim 8, further comprising:
  generating a private value $[d_A]$ of the requestor; and
  calculating a public value $[Q_A]$ of the requestor as a product of the private value $[d_A]$ of the requestor and a base point $[G]$ on the elliptic curve,
  wherein the public value $[Q_A]$ of the requestor is on the elliptic curve, and
  wherein sending the certificate request comprises sending the public value $[Q_A]$ of the requestor.

12. The method as claimed in claim 8, the method further comprising:
  checking whether the extracted information $[V_A]$ complies with certificate policy management rules accessible by the requestor.

13. The method as claimed in claim 11, the method further comprising:
  calculating the reconstructed public key $[K_A]$ from the implicit certificate $[IC_A]$ and from a public key of the CA $[K_{CA}]$, and
  calculating a reconstructed private key $[k_A]$ from the implicit certificate $[IC_A]$, from the implicit signature $[s]$, and from the private value $[d_A]$ of the requestor,
  wherein the reconstructed private key $[k_A]$ forms a key pair with the reconstructed public key $[K_A]$.

14. A method to be performed by a recipient as part of an implicit certificate scheme, the method comprising:
  receiving an implicit certificate $[IC_A]$;
  recovering public-key reconstruction data $[B_A]$ from the implicit certificate $[IC_A]$, wherein the public-key reconstruction data $[B_A]$ is on an elliptic curve and can be used to calculate a reconstructed public key $[K_A]$; and
  extracting information $[V_A]$ from the public-key reconstruction data $[B_A]$ by applying a known function $[F]$ to the public-key reconstruction data $[B_A]$, the known function $[F]$ having been agreed upon by the recipient and by the certificate authority for use by the certificate authority in incorporating the information $[V_A]$ into the public-key reconstruction data $[B_A]$.

15. The method as claimed in claim 14, wherein the extracted information $[V_A]$ is related to one or more of the implicit certificate [$IC_A$], a requestor of the implicit certificate [$IC_A$], and the reconstructed public key [$K_A$].

16. The method as claimed in claim 14, wherein the extracted information [$V_A$] comprises a validity period of the implicit certificate [$IC_A$] or a validity date of the implicit certificate [$IC_A$] or both.

17. The method as claimed in claim 14, the method further comprising:
calculating the reconstructed public key [$K_A$] from the implicit certificate [$IC_A$] and from a public key of a certificate authority [$K_{CA}$]; and
implicitly authenticating the reconstructed public key [$K_A$] by using the reconstructed public key [$K_A$] during communication with a requestor of the implicit certificate [$IC_A$].

18. The method as claimed in claim 14, the method further comprising:
checking whether the extracted information [$V_A$] complies with certificate policy management rules accessible by the recipient.

19. A certificate authority device for use in an implicit certificate scheme, the device comprising:
a processor;
a communication interface able to receive a certificate request from a requestor device, the certificate request comprising a public value [$Q_A$] of the requestor device; and
a memory storing code which, when executed by the processor, results in:
selecting particular information [$V_A$] from a finite set;
performing an iterative process of generating a point [$B_A$] on an elliptic curve and applying a known function [F] to the point [$B_A$], wherein the iterative process is repeated until applying the known function [F] to the point [$B_A$] results in the particular information [$V_A$];
encoding an implicit certificate [$IC_A$] using the point [$B_A$] as public-key reconstruction data [$B_A$]; and
calculating an implicit signature [s] that corresponds to the implicit certificate [$IC_A$],
wherein the iterative process comprises:
generating a private value [$d_{CA}$] of the certificate authority device;
multiplying the private value [$d_{CA}$] of the certificate authority device by a base point [G] to obtain a public value [$Q_{CA}$] of the certificate authority device;
calculating the public-key reconstruction data [$B_A$] as a sum of the public value [$Q_A$] of the requestor device and the public value [$Q_{CA}$] of the certificate authority device; and
determining whether applying the known function [F] to the public-key reconstruction data [$B_A$] results in the particular information [$V_A$],
wherein the public value [$Q_A$] of the requestor device, the base point [G], and the public value [$Q_{CA}$] of the certificate authority device are on the elliptic curve.

20. The certificate authority device as claimed in claim 19, wherein the code, when executed by the processor, further results in:
sending the implicit certificate [$IC_A$] and the implicit signature [s] to the requestor device via the communication interface so that the requestor device is able to calculate from the implicit certificate [$IC_A$] and from the implicit signature [s] a reconstructed private key [$k_A$] which forms a key pair with a public key [$K_A$] that can be reconstructed from the public-key reconstruction data [$B_A$].

21. The certificate authority device as claimed in claim 19, wherein the code, when executed by the processor, further results in:
making the implicit certificate [$IC_A$] available to a recipient device for use in calculating a public key [$K_A$] from the public-key reconstruction data [$B_A$].

22. The certificate authority device as claimed in claim 19, wherein the particular information [$V_A$] is related to one or more of the requestor device, the implicit certificate [$IC_A$], and a public key [$K_A$] that can be reconstructed from public-key reconstruction data [$B_A$].

23. The certificate authority device as claimed in claim 19, wherein the particular information [$V_A$] comprises a validity period of the implicit certificate [$IC_A$] or a validity date of the implicit certificate [$IC_A$] or both.

24. The certificate authority device as claimed in claim 19, wherein in the event that applying the known function [F] to the public-key reconstruction data [$B_A$] does not result in the particular information [$V_A$], the iterative process further comprises:
generating a new private value [new $d_{CA}$] of the certificate authority device;
multiplying the new private value [new $d_{CA}$] of the certificate authority device by the base point [G] to obtain a new public value [new $Q_{CA}$] of the certificate authority device;
calculating new public-key reconstruction data [new $B_A$] as a sum of the public value [$Q_A$] of the requestor device and the new public value [new $Q_{CA}$] of the certificate authority device; and
determining whether applying the known function [F] to the new public-key reconstruction data [new $B_A$] results in the particular information [$V_A$],
wherein the new public value [new $Q_{CA}$] of the certificate authority device and the new public-key reconstruction data [new $B_A$] are on the elliptic curve.

25. The certificate authority device as claimed in claim 19, wherein in the event that applying the known function [F] to the public-key reconstruction data [$B_A$] does not result in the particular information [$V_A$], the iterative process further comprises:
calculating an incremented private value [$d_{CA}$+c] of the certificate authority device as a sum of the private value [$d_{CA}$] of the certificate authority device and a constant integer [c];
calculating incremented public-key reconstruction data [$B_A$+cG] as a sum of the public-key reconstruction data [$B_A$] and a product of the constant integer [c] and the base point [G], wherein the incremented public-key reconstruction data [$B_A$+cG] is on the elliptic curve; and
determining whether applying the known function [F] to the incremented public-key reconstruction data [$B_A$+cG] results in the particular information [$V_A$].

26. A system for use in an implicit certificate generation scheme, the system comprising:
a requestor device to generate a certificate request, the certificate request comprising a public value [$Q_A$] of the requestor device; and
a certificate authority device to receive the certificate request from the requestor, to select particular information [$V_A$] from a finite set, and, in response to receiving the certificate request, to perform an iterative process of generating a point [$B_A$] on an elliptic curve and applying a known function [F] to the point [$B_A$], wherein the iterative process is repeated until applying the known function [F] to the point [$B_A$] results in the particular information [$V_A$], to encode an implicit certificate [$IC_A$] using the point [$B_A$] as public-key reconstruction data, to calculate an implicit signature [s] that corresponds to the implicit certificate [$IC_A$], and to send the implicit certificate [$IC_A$] and the implicit signature [s] to the requestor device, wherein the iterative process comprises:
generating a private value [$d_{CA}$] of the certificate authority device;
multiplying the private value [$d_{CA}$] of the certificate authority device by a base point [G] to obtain a public value [$Q_{CA}$] of the certificate authority device;
calculating the public-key reconstruction data [$B_A$] as a sum of the public value [$Q_A$] of the requestor device and the public value [$Q_{CA}$] of the certificate authority device; and
determining whether applying the known function [F] to the public-key reconstruction data [$B_A$] results in the particular information [$V_A$], wherein the public value [$Q_A$] of the requestor device, the base point [G], and the public value [$Q_{CA}$] of the certificate authority device are on the elliptic curve.

27. The system as claimed in claim 26, wherein the requestor device, in response to receiving implicit certificate [$IC_A$] and the implicit signature [s] from the CA device, is to recover the public-key reconstruction data [$B_A$] from the implicit certificate [$IC_A$] and is to extract the information [$V_A$] from the public-key reconstruction data [$B_A$] by applying the known function [F] to the public-key reconstruction data [$B_A$].

28. The system as claimed in claim 26, wherein the particular information [$V_A$] is related to one or more of the requestor device, the implicit certificate [$IC_A$], and a public key [$K_A$] that can be reconstructed from public-key reconstruction data [$B_A$].

29. The system as claimed in claim 26, wherein the particular information [$V_A$] comprises a validity period of the implicit certificate [$IC_A$] or a validity date of the implicit certificate [$IC_A$] or both.

30. A non-transitory computer readable medium storing code which, when executed by a processor of a certificate authority device, results in:
selecting particular information [$V_A$] from a finite set;
performing an iterative process of generating a point [$B_A$] on an elliptic curve and applying a known function [F] to the point [$B_A$], wherein the iterative process is repeated until applying the known function [F] to the point [$B_A$] results in the particular information [$V_A$];
encoding an implicit certificate [$IC_A$] using the point [$B_A$] as public-key reconstruction data [$B_A$]; and
calculating an implicit signature [s] that corresponds to the implicit certificate [$IC_A$], wherein the iterative process comprises:
generating a private value [$d_{CA}$] of the certificate authority device;
multiplying the private value [$d_{CA}$] of the certificate authority device by a base point [G] to obtain a public value [$Q_{CA}$] of the certificate authority device;
calculating the public-key data [$B_A$] as a sum of a public value [$Q_A$] of a requestor device and the public value [$Q_{CA}$] of the certificate authority device, the public value [$Q_A$] of the requestor device having been received by the certificate authority device in a certificate request from the requestor device; and
determining whether applying the known function [F] to the public-key reconstruction data [$B_A$] results in the particular information [$V_A$], wherein the public value [$Q_A$] of the requestor device, the base point [G], and the public value [$Q_{CA}$] of the certificate authority device are on the elliptic curve.

31. A non-transitory computer readable medium storing code which, when executed by a processor of a requestor device that has sent a certificate request to a certificate authority device, results in:
responsive to receiving from the certificate authority device an implicit certificate [$IC_A$] from which public-key reconstruction data [$B_A$] is recoverable, and an implicit signature [s] that corresponds to the implicit certificate [$IC_A$], wherein the public-key reconstruction data [$B_A$] is on an elliptic curve and can be used to calculate a reconstructed public key [$K_A$]:
recovering the public-key reconstruction data [$B_A$] from the implicit certificate [$IC_A$]; and
extracting information [$V_A$] from the public-key reconstruction data [$B_A$] by applying a known function [F] to the public-key reconstruction data [$B_A$], the known function [F] having been agreed upon by the requestor device and by the certificate authority device for use by the certificate authority device in incorporating the information [$V_A$] into the public-key reconstruction data [$B_A$].

32. A non-transitory computer readable medium storing code which, when executed by a processor of a recipient device, results in:
responsive to receiving an implicit certificate [$IC_A$]:
recovering public-key reconstruction data [$B_A$] from the implicit certificate [$IC_A$], wherein the public-key reconstruction data [$B_A$] is on an elliptic curve and can be used to calculate a reconstructed public key [$K_A$]; and
extracting information [$V_A$] from the public-key reconstruction data [$B_A$] by applying a known function [F] to the public-key reconstruction data [$B_A$], the known function [F] having been agreed upon by the recipient device and by a certificate authority device for use by the certificate authority device in incorporating the information [$V_A$] into the public-key reconstruction data [$B_A$].

* * * * *

UNITED STATES PATENT AND TRADEMARK OFFICE
CERTIFICATE OF CORRECTION

PATENT NO. : 9,003,181 B2  
APPLICATION NO. : 13/070178  
DATED : April 7, 2015  
INVENTOR(S) : Herbert Anthony Little et al.

Page 1 of 1

It is certified that error appears in the above-identified patent and that said Letters Patent is hereby corrected as shown below:

Claims

Column 18, Line 7, In Claim 30, after "key" insert -- reconstruction --.

Signed and Sealed this
Seventeenth Day of November, 2015

Michelle K. Lee
*Director of the United States Patent and Trademark Office*